United States Patent
Baxter, Jr.

(10) Patent No.: US 7,210,566 B2
(45) Date of Patent: May 1, 2007

(54) FRICTION COUPLING ASSEMBLY WITH AUXILIARY CLUTCH CONTROL OF FLUID PUMP

(75) Inventor: Ralph Woodward Baxter, Jr., Fort Wayne, IN (US)

(73) Assignee: Torque-Traction Technologies, LLC, Maumee, OH (US)

( * ) Notice: Subject to any disclaimer, the term of this patent is extended or adjusted under 35 U.S.C. 154(b) by 105 days.

(21) Appl. No.: 11/008,667

(22) Filed: Dec. 10, 2004

(65) Prior Publication Data

US 2006/0124428 A1   Jun. 15, 2006

(51) Int. Cl.
*B60K 17/344*   (2006.01)

(52) U.S. Cl. .................. 192/35; 192/54.3; 192/85 AA
(58) Field of Classification Search ............... None
See application file for complete search history.

(56) References Cited

U.S. PATENT DOCUMENTS

| | | | |
|---|---|---|---|
| 4,095,922 A | 6/1978 | Farr | |
| 4,457,390 A | 7/1984 | Abe et al. | |
| 4,601,378 A | 7/1986 | Pierce et al. | |
| 4,643,269 A | 2/1987 | Arciero et al. | |
| 4,862,769 A | 9/1989 | Koga et al. | |
| 4,937,750 A | 6/1990 | Gilliam | |
| 5,247,443 A | 9/1993 | Gilliam | |
| 5,251,719 A * | 10/1993 | Eto et al. | 180/197 |
| 5,443,426 A | 8/1995 | Frost | |
| 5,723,779 A | 3/1998 | Hara et al. | |
| 5,944,159 A * | 8/1999 | Schneider et al. | 192/85 C |
| 6,009,968 A * | 1/2000 | Kouno | 180/248 |
| 6,165,095 A | 12/2000 | Till et al. | |
| 6,449,549 B1 | 9/2002 | Dick | |
| 6,699,151 B2 | 3/2004 | Grogg et al. | |
| 6,725,989 B1 | 4/2004 | Krisher et al. | |
| 7,021,445 B2 * | 4/2006 | Brissenden et al. | 192/85 R |
| 2003/0173179 A1 | 9/2003 | Gratzer | |
| 2004/0159520 A1 | 8/2004 | Anwar et al. | |

* cited by examiner

*Primary Examiner*—Saul Rodriguez
(74) *Attorney, Agent, or Firm*—Berenato, White & Stavish

(57) ABSTRACT

A friction coupling assembly for a gear drive unit. The friction clutch assembly comprises an input member and at least one output member, a friction clutch for selectively coupling the input member with the at least one output member and an actuator assembly for selectively engaging the friction clutch. The actuator assembly includes a fluid pump operatively connected to the input member or the at least one output member through an auxiliary clutch, a fluid pressure accumulator in fluid communication with the fluid pump for storing a pressurized fluid generated by the fluid pump, and a fluid clutch actuator in fluid communication with the pressure accumulator for loading the friction clutch.

20 Claims, 2 Drawing Sheets ns # FRICTION COUPLING ASSEMBLY WITH AUXILIARY CLUTCH CONTROL OF FLUID PUMP

BACKGROUND OF THE INVENTION

1. Field of the Invention

The present invention relates to friction coupling assemblies for gear drive units, and more particularly to a friction coupling assembly comprising a fluid pump actuated through an auxiliary clutch and a fluid pressure accumulator charged by the fluid pump for loading a friction clutch.

2. Description of the Prior Art

Conventionally, gear drive units, such as automotive differentials or transfer cases, well known in the prior art, are arranged in a mechanical power transmission system to operatively couple an input shaft to one or more output shafts. Such a device essentially distributes the torque provided by the input shaft between the output shafts. Usually, the gear drive units use a frictional clutch assembly between the input and output shafts. The frictional clutch assembly may be selectively actuated by various hydraulic actuator assemblies. The hydraulic actuator assemblies often include displacement pumps. The displacement pumps are usually in the form of internal gear pumps, such as gerotor pumps adapted to convert rotational work to hydraulic work. In the internal gear pumps, an inner gear having outwardly directed teeth cooperates with an external gear having inwardly directed teeth so that fluid chambers therebetween increase and decrease in volume as the inner and outer gears rotate. By connecting the inlet and outlet of the device to the proper location along the sides of the gear set, the variable displacement chambers receive and discharge hydraulic fluid so that the device can function as a pump. A shaft or other mechanical device can be connected to either the inner or outer gear depending upon the type of device. The hydraulic actuator assemblies further include a hydraulic piston member for frictionally loading the friction clutch.

Recent advances in the art may require the disabling of the 1 frictional clutch assembly in the certain conditions. One such system is the yaw stability control, which uses the vehicle's brakes to correct the trajectory of the vehicle during a turn. The impulse braking of the yaw stability control feature generates a speed difference between the wheels on either side of the vehicle. The limited slip feature will engage due to this speed difference and may interfere with the performance of the yaw stability control feature. There is therefore a need to disable the limited slip feature of the hydraulic limited slip differential during specified conditions to ensure proper performance of the devices like yaw stability control while also allowing the limited slip feature to be enabled at other specified conditions where traction may be needed and where yaw control is not essential. There is a problem with current hydraulically actuated limited slip differentials in that they do not have a simple on/off capability which is separate and distinct from the hydraulic pressure supply/control circuit actuating the clutch assemblies.

It is the intent of this invention to overcome the shortcomings of the prior art by providing an external control of the hydraulic pressure generated within a hydraulically actuated frictional clutch assembly in which the hydraulic pump can either be turned on or off, or set at any intermediate condition by controlling the hydraulic pressure supplied to the clutch actuator.

SUMMARY OF THE INVENTION

The present invention provides an improved friction coupling assembly for a gear drive unit. The friction coupling assembly in accordance with the present invention comprises an input member and at least one output member, a friction clutch for selectively coupling the input member with the at least one output member, and an actuator assembly for selectively engaging the friction clutch.

The actuator assembly includes a fluid pump operatively connectable to one of the input member and the at least one output member through an auxiliary clutch, a fluid pressure accumulator in fluid communication with the fluid pump for storing a pressurized fluid generated by the fluid pump, and a fluid clutch actuator in fluid communication with the pressure accumulator for loading the friction clutch.

The friction coupling assembly in accordance with the present invention reduces parasitic losses in the gear drive unit and improves its efficiency.

BRIEF DESCRIPTION OF THE DRAWINGS

Other objects and advantages of the invention will become apparent from a study of the following specification when viewed in light of the accompanying drawings, wherein.

DETAILED DESCRIPTION OF PREFERRED EMBODIMENTS

The preferred embodiment of the present invention will now be described with the reference to accompanying drawings.

Figure 1:
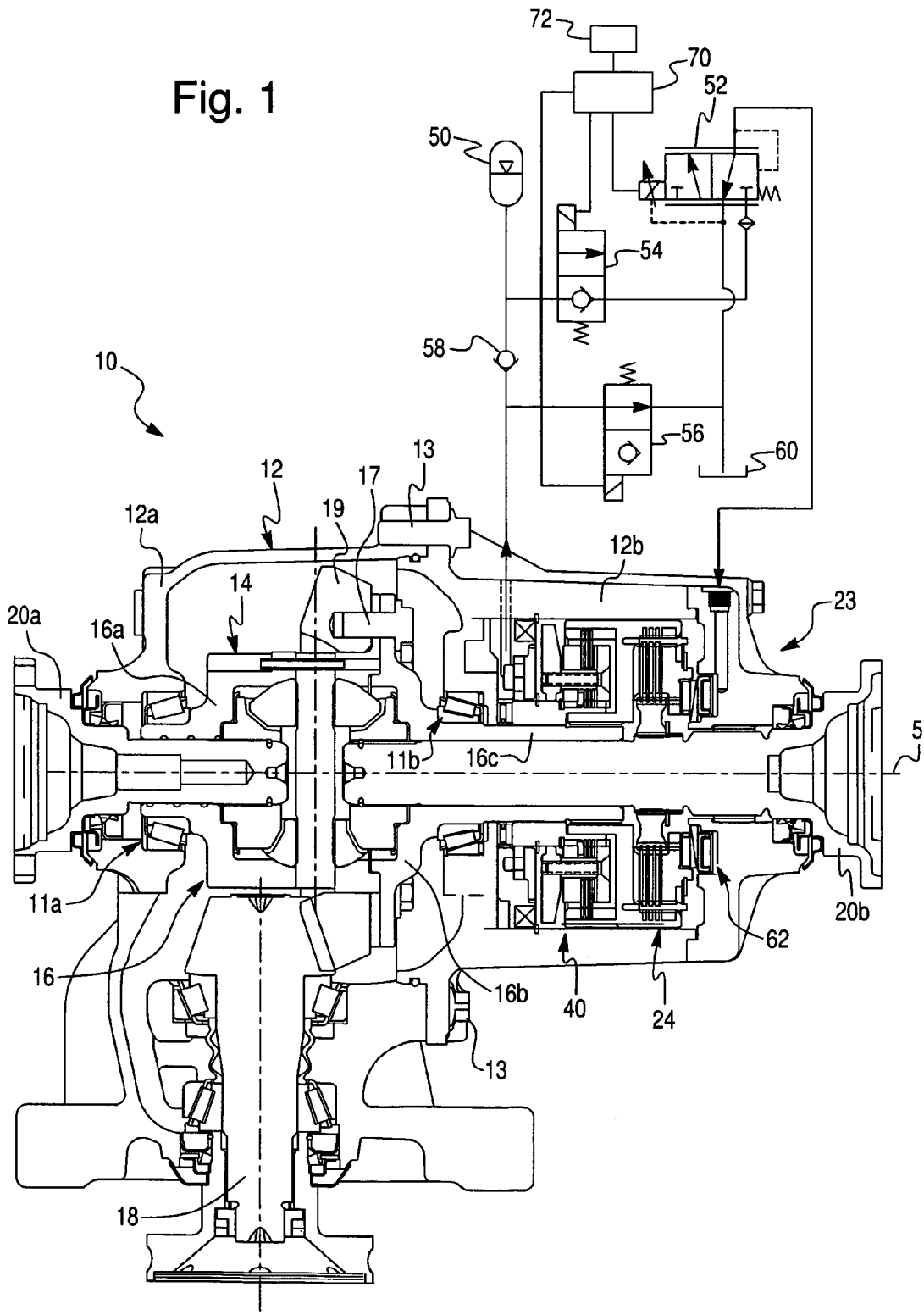
FIG. 1 is a sectional view of vehicle drive axle assembly in accordance with the preferred embodiment of the present invention.

FIG. 1 schematically depicts a vehicle drive axle assembly 10 including a selectively operable limited slip differential (LSD) assembly 14. However, it is to be understood that while the present invention is described in relation to the limited slip differential, the present invention is equally suitable for use in any other gear drive assembly including hydraulically actuated friction couplings, including but not limited to transfer cases.

The differential assembly 14 comprises a differential case 16 supported within an axle housing 12 for rotation about a central axis 5 through roller bearings 11a, 11b and driven by a drive pinion gear 18 transmitting a drive torque from an engine (not shown) to a ring gear 19. The axle housing 12 is made of two half members 12a and 12b fastened to each other, preferably by means of bolts 13. The differential case 16 is also made of two half members 16a and 16b fastened to each other, preferably by means of bolts 17. The differential case half 16b is formed integrally with an elongated sleeve 16c extending into the housing half 12b. The ring gear 19 is bolted or otherwise secured to the differential case 16. A differential gear mechanism disposed within the differential case 16 is operatively coupled to output axle shafts 20a and 20b for allowing differential rotation thereof. Thus, the differential case 16 defines an input member, while the output axle shafts 20a and 20b define output members. The differential gear mechanism disposed within the differential case 16 includes a set of pinion gears rotatably supported on a pinion shaft secured to the differential case 16. The pinion gears engage a pair of opposite side gears adapted to rotate about the axis 5. The side gears are splined to the output axle shafts 20a and 20b.

The LSD assembly 14 further includes a limited slip device in the form of a hydraulically actuated friction coupling assembly 23 including a friction clutch 24 that, when engaged, limits the differential speed between output axle shafts 20a and 20b, and an actuator assembly 25 for axially loading the friction clutch 24.

Figure 2:
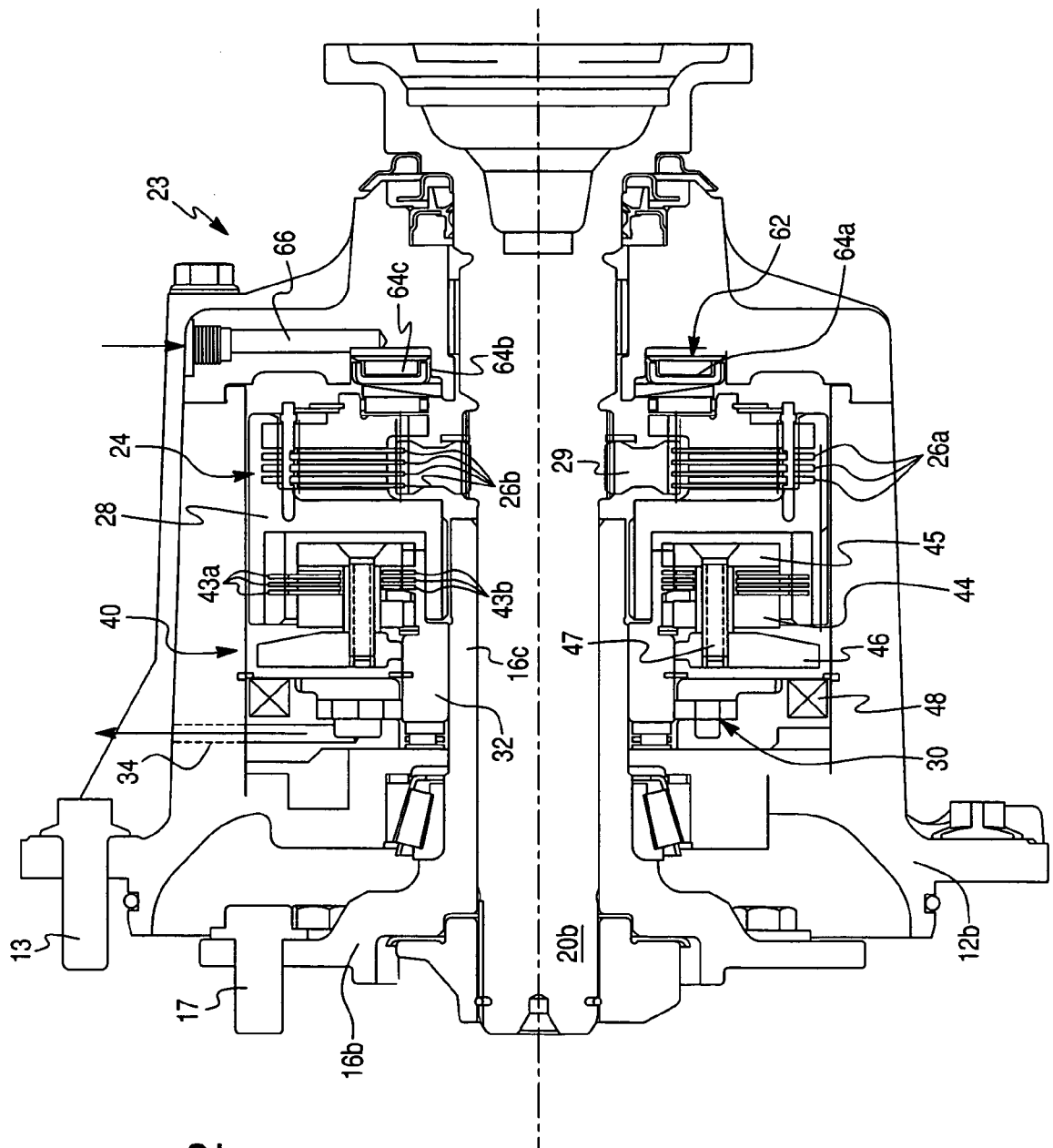
FIG. 2 is an enlarged partial sectional view of a friction coupling assembly of the drive axle assembly shown in FIG. 1 in accordance with the preferred embodiment of the present invention.

As illustrated in detail in FIG. 2, the friction clutch 24 of the limited slip device 23 is provided within a clutch casing 28 which, in turn, is disposed inside the housing half 12b of the axle housing 12 and outside the differential case 16. The friction clutch 24, well known in the prior art, includes a set of alternating outer, or first, friction plates 26a and inner, or second, friction plates 26b. Conventionally, an outer circumference of the outer friction plates 26a is provided with projections that non-rotatably engages corresponding grooves formed in an inner peripheral surface of the clutch casing 28. The clutch casing 28 is non-rotatably coupled to the elongated sleeve 16c of the differential case 16 such as by a spline connection. Similarly, an inner circumference of the inner friction plates 26b is provided with projections that non-rotatably engage corresponding grooves formed in a clutch support ring 30, which in turn is splined to the associated axle shaft 20b. At the same time, both the outer friction plates 26a and the inner friction plates 26b are slideable in the axial direction. The clutch plates 26a frictionally engage the clutch plates 26b to form a torque coupling arrangement between the differential case 16 and the output axle shaft 20b. Thus, when the friction clutch 24 is loaded by the hydraulic actuator assembly 25, i.e. when the outer friction plates 26a frictionally engage the inner friction plates 26b, the relative rotation between the differential case 16 and the output axle shaft 20b is restricted.

The clutch pack 24 is selectively actuated by the hydraulic actuator assembly 25 including a hydraulic displacement pump 30, an auxiliary electromagnetic clutch 40, a hydraulic pressure accumulator 50 provided to be charged by the hydraulic pump 30, and a piston assembly 62 for axially loading the friction clutch 24 using hydraulic pressure stored in the pressure accumulator 50. The hydraulic pump 30 is mounted within the axle housing 12 to a drive sleeve 32 which is rotatably mounted about the elongated sleeve 16c of the differential case 16.

Preferably, the hydraulic displacement pump 30 employed to provide pressurized hydraulic fluid to actuate the friction clutch 24 is a gerotor pump. The gerotor pump 30 is well known in the art and includes an outer ring member, an outer rotor, and an inner rotor. The inner rotor drivingly coupled to the drive sleeve 32, and the outer ring member is secured to the axle housing 12.

The inner rotor has one less tooth than the outer rotor and when the inner rotor is driven, it will drive the outer rotor, which can freely rotate within the outer ring member eccentrically with respect to the inner rotor, thus providing a series of decreasing and increasing volume fluid pockets by means of which fluid pressure is created. However, it will be appreciated that any other appropriate type of hydraulic pump for generating hydraulic fluid pressure is within the scope of the present invention.

The electromagnetic clutch 40 is provided to non-rotatably couple the hydraulic pump 30 to the elongated sleeve 16c of the differential case 16. The electromagnetic clutch 40 comprises a clutch pack 42 disposed between a fixed ring 44 and a slidable pressure ring 45, an armature ring 46 connected to the pressure ring 45 through connecting pins 47, and an electromagnetic coil 48. The clutch pack 42 includes sets of alternating outer friction plates 43a and inner friction plates 43b. Conventionally, an outer circumference of the outer friction plates 43a is provided with projections that non-rotatably engages corresponding grooves formed in the inner peripheral surface of the clutch casing 28. Similarly, an inner circumference of the inner friction plates 43b is provided with projections that non-rotatably engage corresponding grooves formed in the drive sleeve 32. At the same time, the friction plates 43a and 43b are slidable in the axial direction.

The electro-magnetic coil 48, hence the electromagnetic clutch 40, is electronically controlled by an electronic control module (ECM) 70 (shown in FIG. 1) based on one or more vehicle parameters as control inputs 72, such as a vehicle speed, a wheel speed difference, a vehicle yaw rate, a vehicle lateral acceleration, a steering angle, an engine throttle position, a brake application, an ice detection, a vehicle driveline configuration, hydraulic fluid temperature and pressure, a stability control system actuation, etc. When energized by a control signal from the ECM 70, the electromagnetic coil 48 attracts the armature ring 46 and the slidable pressure ring 45, which presses the friction plates 43a and 43b against the fixed ring 44, thus actuating the clutch pack 42 to form a torque coupling arrangement between the differential case 16 and the hydraulic pump 30. Thus, when the clutch pack 42 of the electromagnetic clutch 40 is loaded by the electro-magnetic coil 48, i.e. when the outer friction plates 43a frictionally engage the inner friction plates 43b, the drive sleeve 32, thus the hydraulic pump 30, is drivingly coupled to the elongated sleeve 16c of the differential case 16 through the clutch casing 28. In other words, when the electro-magnetic coil 48 of the electromagnetic clutch 40 is excited by the ECM 70, the hydraulic pump 30 is actuated and supplies pressurized hydraulic fluid to the pressure accumulator 50. Alternatively, the hydraulic pump 30 may be drivingly coupled by the electromagnetic clutch 40 to the output axle shaft 20b.

The hydraulic pump 30 is actuated by the ECM 70 through the electromagnetic clutch 40 only when the pressure buildup in the accumulator 50 is required, i.e. when the pressure within the accumulator 50 is below a predetermined level. When the predetermined pressure level in the accumulator 50 is reached, the hydraulic pump 30 is turned off by disengaging the electromagnetic clutch 40, thus reducing parasitic losses in the drive axle assembly 10. Alternatively, the hydraulic flow from the hydraulic pump 30 can be directed to another area at a lower pressure, again increasing efficiency of a vehicular drive train.

In the exemplary embodiment depicted in FIG. 1, the friction clutch coupling 24, the electromagnetic clutch 40 and the fluid pump 30 are disposed about the output axle shaft 20b and the elongated sleeve 16c of the differential case 16. Alternatively, the above elements of the friction coupling assembly 23 could be located about the drive pinion gear 18, or any other appropriate location.

The pressurized hydraulic fluid is supplied to the pressure accumulator 50 by the hydraulic pump 30 through an output passage 34, preferably formed in the axle housing 12. The output passage 34 is in fluid communication with an outlet port of the hydraulic pump 30 and the pressure accumulator 50 through a check valve 58.

The hydraulic actuator assembly 25 further includes a control valve 52 in the form of a variable solenoid operated 3/2 valve, a flow regulation valve 54 in the form of a solenoid operated 2/2 valve and a solenoid operated pressure relief valve 56 all selectively controlled by the ECM 70. The pressure relief valve 56 selectively fluidly connects the hydraulic pump 30 with a fluid reservoir 60 defined within the axle housing 12 for storing an appropriate amount of the hydraulic fluid used to actuate the friction clutch coupling 24.

The control valve 52 and the flow regulation valve 54 are provided for selectively fluidly connect the pressure accumulator 50 with the piston assembly 62 through an inlet fluid passage 66, preferably formed in the axle housing 12, and to variably regulate the fluid pressure supplied to the piston assembly 62 in response to a signal from the ECM 70. The piston assembly 62 includes a hydraulically actuated piston 64a disposed within a piston housing 64b formed in the axle housing 12, and serves to compress the friction clutch 24 and retard any speed differential between the output axle shafts 20a and 20b. The pressurized hydraulic fluid to actuate the piston 26a and engage the friction clutch 24 is provided by the pressure accumulator 50. The pressurized fluid in the piston pressure chamber 64c creates an axial force upon the piston 64a for applying a compressive clutch engagement force on the friction clutch 24, thereby transferring drive torque between the output axle shafts 20a, 20b through the differential case 15. The amount of torque transfer (i.e., the torque ratio or split) is progressive and continuously variable and is proportional to the magnitude of the clutch engagement force exerted by the piston 64a on the friction clutch 24 which, in turn, is a function of the fluid pressure within the piston chamber 64c. Moreover, the magnitude of the fluid pressure within piston pressure chamber 64c, as delivered thereto by the hydraulic pressure accumulator 50, is controlled by the ECM 70 through the control valve 52.

Therefore, a gear drive assembly in accordance with the present invention is provided with a novel arrangement of a friction clutch assembly having an electromagnetic actuator for activating a fluid pump for charging fluid pressure accumulator in fluid communication with a fluid clutch actuator axially loading a friction clutch.

The foregoing description of the preferred embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A friction coupling assembly for a gear drive unit, said friction clutch assembly comprising:
    an input member and at least one output member;
    a friction clutch for selectively coupling said input member with said at least one output member; and
    an actuator assembly for selectively engaging said friction clutch, said actuator assembly including:
        a fluid pump selectively connectable to one of said input member and said at least one output member through an auxiliary clutch;
        a fluid pressure accumulator in fluid communication with said fluid pump for storing a pressurized fluid generated by said fluid pump; and
        a fluid clutch actuator in fluid communication with said pressure accumulator for loading said friction clutch;
        said fluid pump, said friction clutch and said auxiliary clutch being mounted about one of said input member and said at least one output member.

2. The friction coupling assembly as defined in claim 1, wherein said friction clutch includes at least one first friction plate coupled to rotate with said at least one output member and at least one second friction plate coupled to rotate with said input member.

3. The friction coupling assembly as defined in claim 1, wherein said friction clutch includes a plurality of first friction plates coupled to rotate with said input member and a plurality of second friction plates coupled to rotate with said at least one output member, said friction plates are frictionally engageable with one another.

4. The friction coupling assembly as defined in claim 1, wherein said fluid pump is a gerotor pump.

5. The friction coupling assembly as defined in claim 1, further including an electronic control module for selectively controlling said auxiliary clutch for actuating said fluid pump.

6. The friction coupling assembly as defined in claim 5, wherein said electronic control unit selectively controls said auxiliary clutch in response to at least one operational parameter of said gear drive unit.

7. The friction coupling assembly as defined in claim 6, wherein said at least one operational parameter is at least one of a fluid temperature and a fluid pressure.

8. The friction coupling assembly as defined in claim 5, wherein said auxiliary clutch is an electro-magnetic clutch.

9. The friction coupling assembly as defined in claim 1, wherein said fluid pump, said friction clutch and said auxiliary clutch are disposed adjacent to each other.

10. The friction coupling assembly as defined in claim 1, wherein said actuator assembly further includes a control valve provided for selectively fluidly connect said fluid pressure accumulator with said fluid clutch actuator.

11. The friction coupling assembly as defined in claim 10, further including an electronic control module for selectively controlling said control valve in order to variably regulate the fluid pressure supplied to said fluid clutch actuator in response to a signal from said electronic control module.

12. The friction coupling assembly as defined in claim 11, wherein said electronic control module selectively controls said control valve in response to at least one operational parameter of said gear drive unit.

13. The friction coupling assembly as defined in claim 12, wherein said gear drive unit is a drive axle of a motor vehicle, and said electronic control module selectively controls said control valve in response to at least one operational parameter of said motor vehicle.

14. The friction coupling assembly as defined in claim 13, wherein said at least one operational parameter of said motor vehicle is selected from the group consisting of a vehicle speed, a wheel speed difference, a vehicle yaw rate, a steering angle, an engine throttle position, a vehicle lateral acceleration, a brake application, an ice detection, a driveline configuration, and yaw stability control system actuation.

15. The friction coupling assembly as defined in claim 13, wherein said input member is a differential case and at least one output member is an output axle shaft of said drive axle of said motor vehicle.

16. The friction coupling assembly as defined in claim 10, further including an electronic control module for selectively controlling said auxiliary clutch and said control valve in order to variably regulate the fluid pressure supplied to said fluid clutch actuator in response to a signal from said electronic control module.

17. The friction coupling assembly as defined in claim 16, wherein said electronic control module selectively controls said auxiliary clutch and said control valve in response to at least one operational parameter of said gear drive unit.

18. The friction coupling assembly as defined in claim 1, wherein said fluid clutch actuator is in the form of a piston assembly for axially loading said friction clutch.

19. The friction coupling assembly as defined in claim 1, wherein said input member is disposed substantially coaxially to said at least one output member.

20. A friction coupling assembly for a gear drive unit, said friction coupling assembly comprising:
   an input member and at least one output shaft;
   a friction clutch for selectively coupling said input member with said at least one output shaft, said friction clutch includes a plurality of first friction plates coupled to rotate with said input member and a plurality of second friction plates plate coupled to rotate with said at least one output shaft, said friction plates being frictionally engageable with one another; and
   an actuator assembly for selectively engaging said friction clutch, said actuator assembly including:
      a gerotor pump operatively connected to said input member through an electro-magnetic clutch to be driven by said input member;
      a fluid pressure accumulator in fluid communication with said fluid pump for storing a pressurized fluid generated by said fluid pump; and
      a fluid clutch actuator in fluid communication with said pressure accumulator for loading said friction clutch;
      a control valve provided for selectively fluidly connect said fluid pressure accumulator with said fluid clutch actuator; and
   an electronic control module for selectively controlling said electro-magnetic clutch and said control valve in order to variably regulate the fluid pressure supplied to said fluid clutch actuator in response to a signal from said electronic control module;
   said gerotor pump, said friction clutch and said electro-magnetic clutch being mounted about said at least one output shaft adjacent to each other;
   wherein said electronic control module selectively controls said electro-magnetic clutch and said control valve in response to at least one operational parameter of said gear drive unit.

\* \* \* \* \*